United States Patent [19]

Lair

[11] Patent Number: 6,027,071

[45] Date of Patent: Feb. 22, 2000

[54] THRUST REVERSER WITH THROAT TRIMMING CAPABILITY

[76] Inventor: Jean-Pierre Lair, 127 Paddington Way, San Antonio, Tex. 78209

[21] Appl. No.: 09/143,798

[22] Filed: Aug. 31, 1998

[51] Int. Cl.[7] .................................................. B64C 25/68
[52] U.S. Cl. .................. 244/110 B; 60/230; 239/265.19; 411/399; 411/539; 403/3
[58] Field of Search ................... 244/110 B; 239/265.19; 60/226.2, 230; 403/3, 4; 411/539, 399

[56] References Cited

U.S. PATENT DOCUMENTS

| | | | |
|---|---|---|---|
| 3,684,182 | 8/1972 | Maison | 239/265.19 |
| 4,129,269 | 12/1978 | Fage | 244/110 B |
| 4,966,327 | 10/1990 | Fage et al. | 239/265.29 |
| 5,176,340 | 1/1993 | Lair | 244/110 B |
| 5,181,676 | 1/1993 | Lair | 244/110 B |
| 5,221,048 | 6/1993 | Lair | 239/265.37 |
| 5,294,055 | 3/1994 | Garrett et al. | 239/265.19 |
| 5,310,117 | 5/1994 | Fage et al. | 239/265.29 |
| 5,419,515 | 5/1995 | Lair | 244/110 B |

Primary Examiner—Michael J. Carone
Assistant Examiner—James S. Bergin
Attorney, Agent, or Firm—Harold H. Dutton, Jr.

[57] ABSTRACT

A thrust reverser comprising a pair of symmetrical thrust reverser doors pivotally mounted on an axis which is substantially diametrically positioned with respect to the exhaust nozzle of an engine, hinge fittings secured to the doors, pivot brackets secured to a fixed part of the engine, pivot bolts securing the hinge fittings of the thrust reverser doors to the pivot brackets and forming the pivot axis for the doors, the pivot brackets having elongated openings formed therein for receiving the pivot bolts, the pivot bolts having elongated shoulders for engaging one of the elongated openings and positioning the pivot bolts therein, and a washer having an elongated boss for engaging another of the elongated openings and thereby positioning the pivot bolt in the elongated openings. A method for carrying out the trimming of the throat area is also disclosed and comprises changing the pivot bolts in order to shift the pivot axis from its original position to a new, offset position.

5 Claims, 4 Drawing Sheets

THRUST REVERSER WITH THROAT TRIMMING CAPABILITY

This invention relates to a rust reverser for jet engines. More particularly, the invention relates to a thrust reverser which incorporates trimming capability in order to accommodate variations in the engine throat area during the development of an engine, or to allow for compensation as the engine performance degrades over time. The invention also relates to a method for trimming the throat area value of a thrust reverser.

BACKGROUND AND OBJECTS OF THE INVENTION

Thrust reversers commonly used on commercial aircraft engines are generally of two types. A first, newer type of thrust reverser for jet engines generally comprises a pair of thrust reverser door members which are pivotally mounted to the rear of an engine about an axis which is substantially diametrical with respect to the exhaust nozzle of the engine. These thrust reverser doors having scarfed trailing edges in order to allow the doors to pivot between stowed and deployed positions, and the thrust reverser also includes a pair of pivotally mounted half shells surrounding at least the trailing edges of the thrust reverser doors and defining a planar exhaust outlet for the engine. In this type of thrust reverser, the throat area of the exhaust outlet is defined either by the half shells, or partly by the doors and the half shells.

A second, older type of thrust reverser comprises only a pair of thrust reverser doors which are pivotally mounted on an engine about an axis which is substantially diametrical with respect to the exhaust nozzle of the engine, but without the half shells. The doors also have scarfed trailing edges in order to allow the pivoting between stowed and deployed positions.

This present invention relates to an improved thrust reverser of either type for jet engines, especially the kind used on aircraft. More particularly, the invention relates to a thrust reverser which integrates a connecting mechanism enabling the trimming or adjusting of the area of the throat of the exhaust outlet. This exhaust outlet can be defined by the thrust reverser doors alone, or by the exhaust nozzle only (formed and defined by two half shells surrounding the reverser doors), or by the combination of thrust reverser doors and exhaust nozzle.

In order to reduce the landing distance of a jet powered aircraft as well as to increase the level of safety when the aircraft is landing on a wet or icy runway, thrust reversers are utilized on the jet engines in order to provide a braking thrust for the aircraft. Typically, such thrust reversers are formed by thrust reverser doors or by a combination of thrust reverser doors and a pair of half shells. The reverser doors are capable of pivoting between two positions about an axis which is transverse to the longitudinal or thrust axis of the engine, and substantially diametrically positioned with respect to the jet of the engine.

In the first position, the doors (or the doors with the two half shells as described in U.S. Pat. No. 5,176,340) are in a stowed position, out of the direct path of the exhaust blast of the engine. In this position, the doors when not fitted with the two half shells, or the doors and the two half shells form the exhaust nozzle of the engine so that the thrust of the engine is directed rearward, thereby producing the forward thrust of the aircraft. In the second or deployed position, the doors are pivoted about the pivot axis to a transverse, blast deflecting or deployed position, to intercept and redirect the jet blast and produce the aerodynamic braking rust of the aircraft when called for by the pilot of the aircraft. The invention deals only with the first position, i.e. the stowed position, and allows for trimming of adjustment of the thrust reverser to a specific engine.

The prior art discloses non-adjustable or non-trimmable exhaust area nozzles for thrust reversers. For example, U.S. Pat. Nos. 4,129,269 and 5,176,340 show the type of thrust reverser which can benefit from the present invention. The thrust reversers shown in these two patents are designed, developed and manufactured for a specific engine and for precise engine specifications. This can be a drawback, however, since during the development of new engines, the engine manufacturer does not accurately know what will be the final required throat area of the exhaust nozzle. Since the exhaust nozzle is formed by either the thrust reverser doors, or the thrust reverser doors and their associated half shells (U.S. Pat. No. 5,376,340), and since the exhaust nozzle is usually designed, developed and manufactured at the same time as the design, development and manufacture of a new engine, the throat area is designed to an estimated value.

But, when the engine and thrust reverser get to the final stage of development and are ready for manufacture, and the time arrives to mate the thrust reverser to the engine, changes often have taken place in the engine design specifications which require corresponding changes to the thrust reverser before it can be properly fitted to the engine. This can be extremely costly and detrimental to the program schedule, to redesign and hence remanufacture the thrust reverser exhaust nozzle to the final throat area, to accommodate even a 2 or 3 percent change in the throat area The prior art also discloses some variable area exhaust nozzles for thrust reversers as shown for example in U.S. Pat. Nos. 5,181,676 and 4,966,327. A variable area exhaust nozzle provides certain benefits for the jet engines, in enabling them to adapt and optimize their performance to different conditions of the flight, for example during take-off, climb and cruise. The variable area exhaust provides also a trimming capability to the exhaust nozzle, allowing each production thrust reverser exhaust nozzle to be fully optimized with the production engine on which it will be installed. While this capability eliminates some of the above described drawbacks, the prior art also requires the utilization of actuation controlling devices to accomplish the trimming or to vary the throat area of the exhaust nozzle. This in turn is a factor which increases both the cost and the weight of the thrust reverser and the engine assembly.

Due to manufacturing tolerances the basic engine parameter of thrust versus low rotor compressor (fan) speed (N−1) varies from engine to engine. A trimmable nozzle will allow the engine manufacturer to adjust the mass air flow and the engine pressure ratio so that each engine delivered will produce rated thrust at rated N−1. Also with the normal engine usage, engine performance erodes with time. A trimmable nozzle will allow recovery of some degraded engine performance by simply carrying out the adjusting method of this invention on the nozzle.

Accordingly, a primary object of the present invention is to provide a thrust reverser that overcomes the aforementioned disadvantages of prior art thrust reversers.

A further object of the invention is to provide a thrust reverser which integrates a trimming capability for the exhaust nozzle.

Still another object of the invention is to provide a thrust reverser having trimming capability for the exhaust nozzle without the utilization of actuators or actuation controlling devices.

Still another object of the invention is to provide a thrust reverser construction wherein the structure which is holding the reverser exhaust nozzle has the capability of allowing the trimming of the throat area of the exhaust nozzle, without re-design of the reverser, to ensure therefore at low cost, that the exhaust area has the same value as the one finally chosen by the engine manufacturer.

Yet another object of the invention is to ensure, through the trimming capability of the exhaust nozzle, that each production thrust reverser exhaust nozzle is fully optimized with the production engine on which it will be installed.

Yet another object of the invention is to ensure, through the trimming capability of the exhaust nozzle, that the normal and known engine performance degradation over time can be easily compensated.

Still a further object of this invention is to provide an improved method for trimming the throat area value of the engine nozzle for an engine equipped with a thrust reverser.

These and other objects and advantages of this invention will become apparent from a consideration of the following description of the invention.

DESCRIPTION OF THE INVENTION

The present invention provides a thrust reverser having the ability to permit trimming to the throat area of an exhaust nozzle, whether formed by a thrust reverser alone or by a thrust reverser having a pair of half shells forming the exhaust outlet. According to the invention, the pivot connections between the thrust reverser doors and the jet pipe or other fixed structure to which the thrust reverser doors are attached are provided by means of a pivot fitting having a plurality of bolt holes through which the pivot bolts pass for securing the pivot bracket of the reverser doors to the engine. The bolt holes in the pivot fitting are elongated or oblong. The pivot bolts have an enlarged head, an elongated or oblong shoulder or boss of a shape such a;

to fit snugly in the elongated bolt holes. The cylindrical bolt extends from the shoulder, but is positioned along the major axis of the elongated shoulder at a position which determines the pivot axis location. Typically the thrust reverser throat area value could be designed with the cylindrical bolt stem in the center of the major axis of the elongated boss. In this manner, by using a bolt with the cylindrical stem position closer to one end or the other, the pivot axis is moved, thereby increasing or decreasing the throat area value.

A special washer is provided with a head and an elongated or oblong shoulder, and the bolt hole passes through this shoulder at a location along the major axis of the elongated shoulder such as to cooperate with the particular bolt.

in the case of a thrust reverser using a pair of half-shells forming the throat of the nozzle, a second pivot fitting is provided for the half shells, and it is similar to the fitting for the reverser doors. Indeed, this second fitting could be combined with the first to reduce the number of parts still further. This allows adjusting the pivot point of the half shells as well as the pivot point of the reverser doors.

According to the method of the invention, the throat area value of the nozzle is trimmed by changing the pivot bolts securing the reverser doors, or the reverser doors and the half shells, in order to shift the pivot axis for increasing or decreasing the throat area value of the nozzle. This is done by replacing the pivot bolts with pivot bolts having a greater or lesser degree of offset.

DESCRIPTION OF THE DRAWINGS

The invention will now be described in greater detail with particular reference to the accompanying drawings, which show by way of non-limiting examples, the preferred features and embodiments of the invention. In the drawings.

DETAILED DESCRIPTION OF THE PREFERRED EMBODIMENTS

Figure 1:
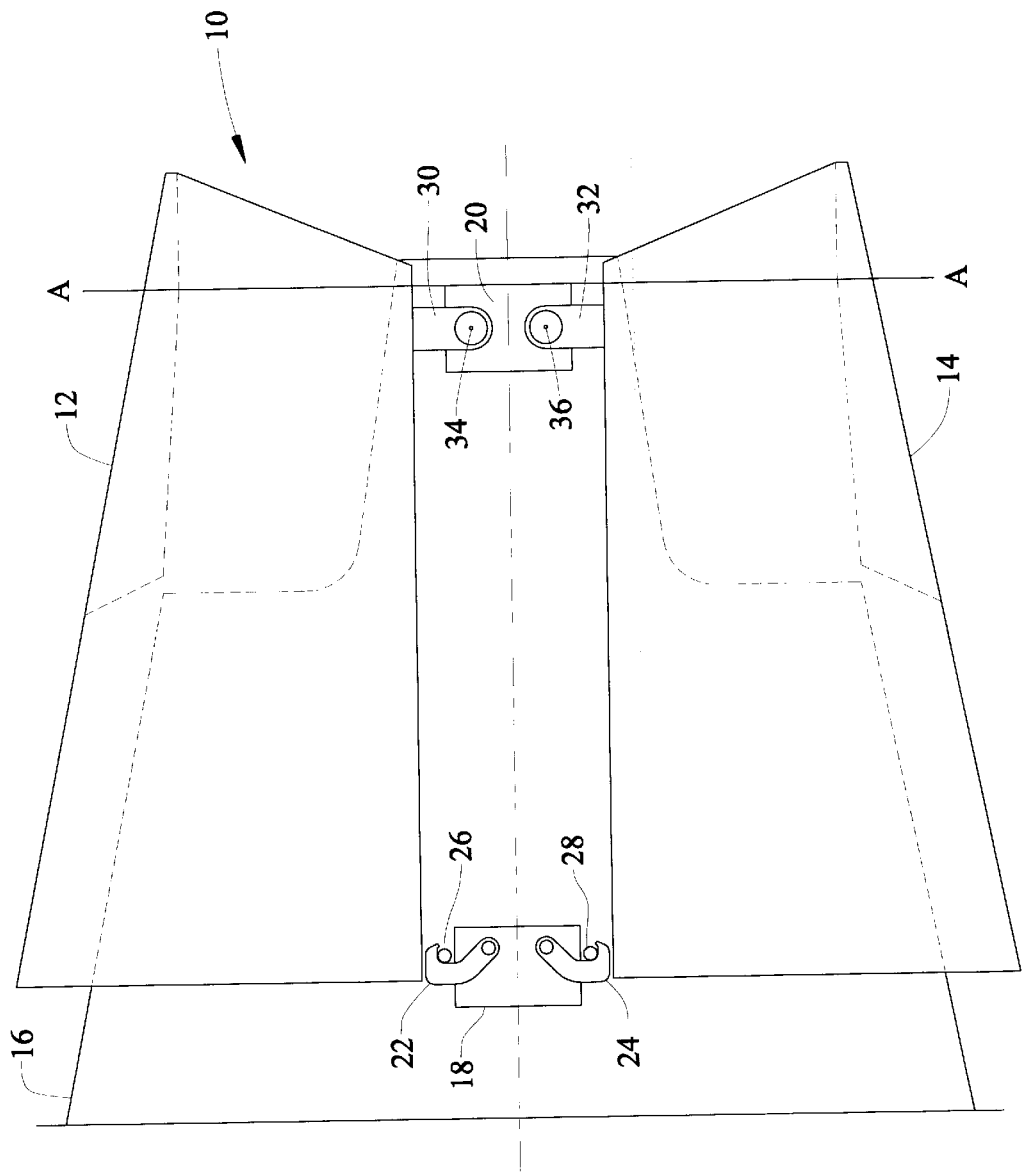
FIG. 1 is a schematic representation of one prior art thrust reverser of the type having two thrust reverser doors forming the exhaust and throat of the nozzle.

In order to gain a better understanding of the present invention, reference will be made to FIGS. 1 and 2, which illustrate schematically the prior art thrust reversers. In FIG. 1, the exhaust nozzle generally designated 10 is formed by the two reverser doors 12 and 14, which are secured to a fixed structure 16, usually called jet pipe, in the vicinity of the doors leading edges through the latching system 18, and at their trailing edge through a pivot fitting 20. The latching system 18 (schematically shown) comprises at least one assembly usually having of two latches 22 and 24 respectively engaging and hence retaining the latch retainers 26 and 28 of the reverser doors 12 and 14 in their stowed position. The pivot fitting 20 (schematically shown) is holding the thrust reverser doors, 12 and 14 in either of their positions (stow/deploy) through the hinge fittings 30 and 32 and the bolts 34 and 36. Bolts 34 and 36 are standard and pass through holes drilled in pivot fitting 20. It will be apparent that a similar arrangement of fittings, latches, and bolts is on the opposite side of the thrust reverser.

In this structural arrangement with the reverser doors in the stowed configuration, the doors 12 and 14 form the exhaust nozzle, and the throat of that nozzle is generally located just upstream of the trailing edge of the of the doors in the location indicated by the line A—A. This throat area is not adjustable. As a consequence, if during development of a production engine, the engine manufacturer requests a throat area value different from the one originally specified for the design and development of the thrust reverser nozzle, then said reverser nozzle has to be modified to accommodate the different throat area value, which in turn contributes to a significant cost increase and program schedule delay. U.S. Pat. No. 4,966,327 eliminates this problem by providing a variable throat area, however the control of the throat area requires the utilization of actuator control devices which in turn are factors contributing to cost and weight increases.

Figure 2:
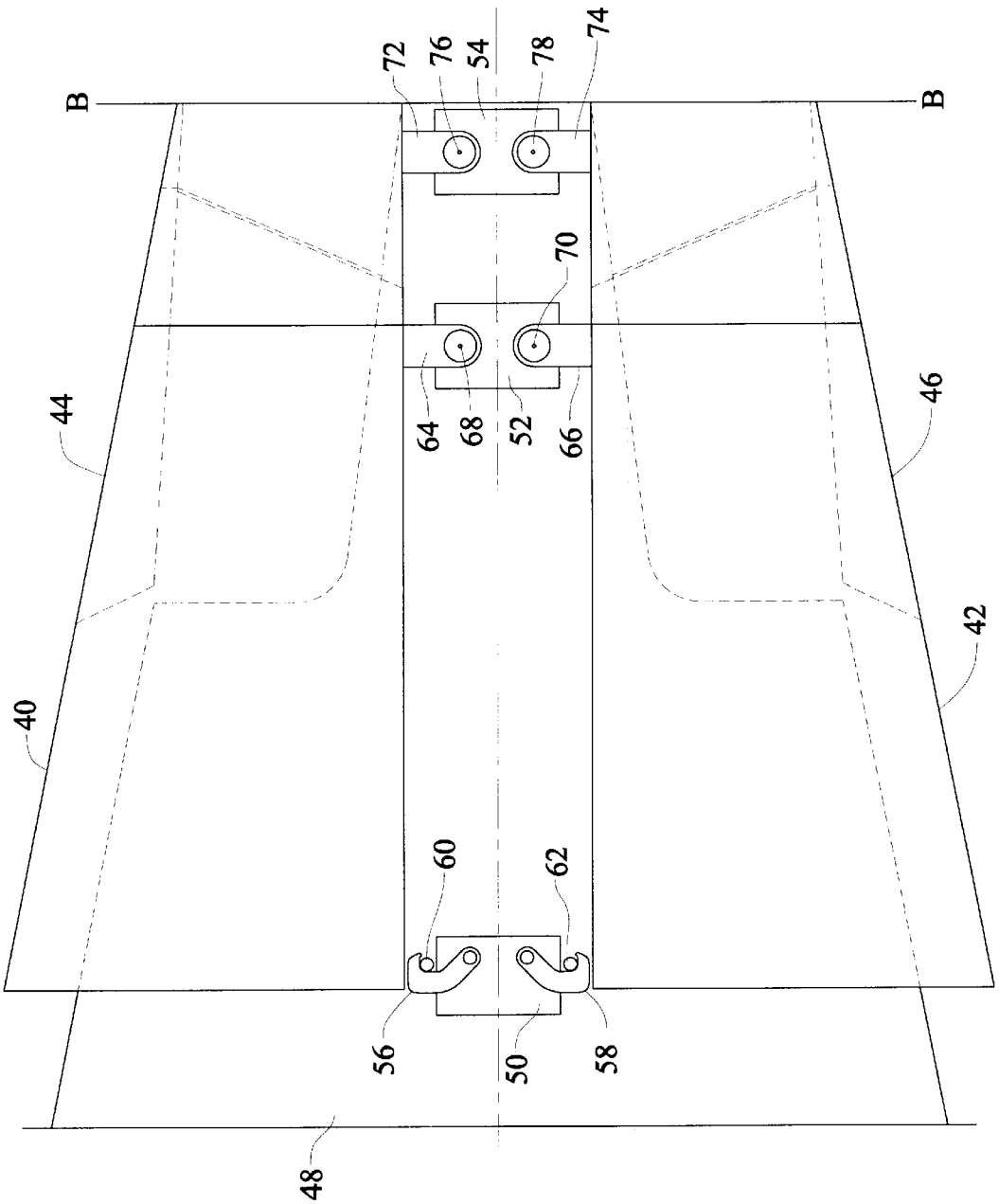
FIG. 2 is a schematic representation of a second prior art thrust reverser of the type with two doors and two half shells forming the exhaust and the throat of the nozzle.

In FIG. 2, a different type of thrust reverser is shown wherein the nozzle is formed by two reverser doors 40 and 42 and two half shells 44 and 46. These are secured to a fixed structure 48, the jet pipe, in the vicinity of the leading edge of the reverser doors through the latching system 50, in the vicinity of the trailing edge of the reverser doors through a pivot fitting 52 and in the vicinity of the two half shells through a pivot fitting 54. As in FIG. 1, the latching system 50 is at least one assembly usually composed of two latches 56 and 58 respectively engaging and hence retaining the latch retainers 60 and 62 of the reverser doors 40 and 42 in their stowed position. The pivot fitting 52 holds the thrust reverser doors 40 and 42 in either of their positions (stow/deploy) through the hinge fitting 64, 66 and the associated bolts 68 and 70. The pivot fitting 54 holds the two half shells 44 and 46 in either of their positions (stow/deploy) through the hinge fittings 72, 74 and the respective associated bolts 76 and 78. In such a structural configuration, which is described in U.S. Pat. No. 5,176,340 and hence will not be furthermore described, with the reverser doors and the two half shells in the stowed position, the two half shells form the nozzle, and the throat area is usually located at the trailing edge or in the vicinity of the trailing edge of said half shells as indicated by the line B—B, and is not adjustable. As a consequence, if during development of a production engine, the engine manufacturer requests a throat area value different than the one originally provided for the design and development of the thrust reverser nozzle, then the reverser nozzle must be modified to accommodate the different throat area value. This modification in turn is a significant contributor to cost increases and program schedule delays. U.S. Pat. No. 5,181,676 eliminates this problem by providing a variable throat area. However the control of the throat area requires the utilization of actuator control devices which in turn are factors contributing to cost and weight increases.

To eliminate the various drawbacks of the previous technology, as explained previously, the invention as shown in FIG. 3 provides trimming capability for the reverser exhaust nozzle. For the reverser configuration of the type shown in FIG. 1, the pivot fitting 20 of FIG. 1 and associated retaining bolts 34 and 36 are replaced by the assembly shown in exploded view in FIG. 3. For the reverser configuration of the type shown in FIG. 2, the pivot fittings 52 and 54 are each replaced by the assembly shown in FIG. 3 together with the associated retaining bolts 68, 70, 76 and 78 (or alternatively the two such fittings can be integrated into a double fitting member within the scope of this invention).

Figure 3:
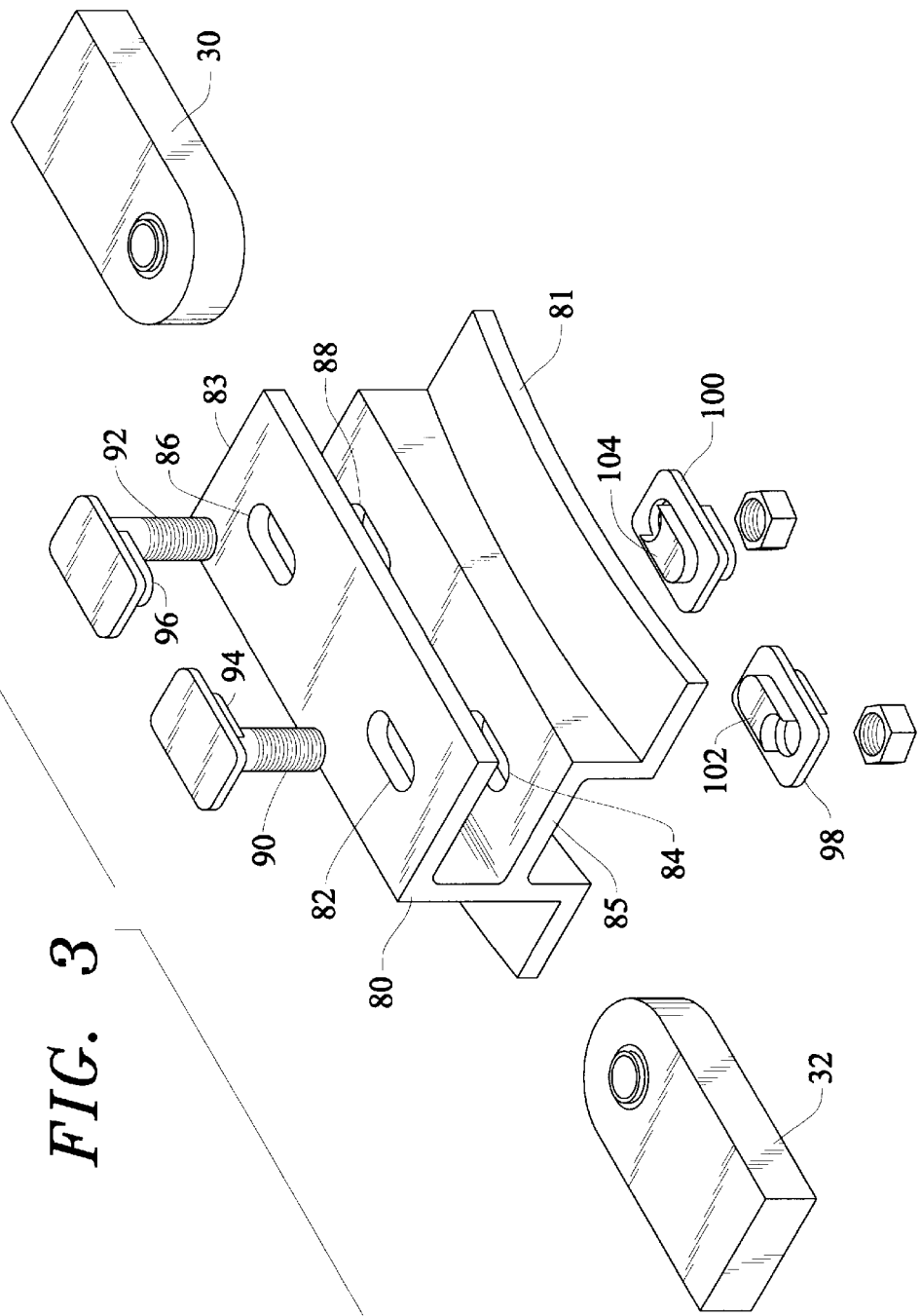
FIG. 3 is an exploded perspective view of the fitting which is holding the reverser exhaust nozzle and which is enabling trimming of said exhaust nozzle.

Referring to FIG. 3, the pivot fitting 80 may be described as a clevis type fitting with an arcuate base 81 secured to the jet pipe, and a pair of spaced plates 83, 85 having elongated or oval holes 82, 84 and 86, 88 formed therein. Typically the fitting would be fastened to the jet pipe. The associated special threaded retaining bolts 90, 92 (FIGS. 3 and 4) which are the pivot points of the reverser door hinges and of the two half shells have an oblong shoulder or boss, respectively 94, 96 which engage respectively oblong holes 82 and 86.

In addition, the assembly shown in FIG. 3 has two special retaining washers 98, 100 (FIGS. 3 and 4) which engage respectively with threaded retaining bolts 90 and 92. The retaining washers have also an oblong shoulder or boss 102, 104 which engage corresponding oblong holes 84, 88. The bolts 90, 92 pass through the hinge fittings 30, 32 (or 64, 66) so that the reverser doors may pivot about the pivot bolts. When the pivot fitting 80 is fitted with the special couple bolt/washer 90, 98 and 92, 100, the pivot axis of the reverser doors 12 or 14, i.e. the longitudinal axis of the bolt 90 or 92, is shifted with respect to the stationary, oblong holes, while the shoulders or bosses 94,96, 102 and 104 fit snugly into the oblong holes 82, 84,86 and 88, making a secure fit and connection between the hinge fittings 30, 32 and the hinge bolts 90, 92. This connection is as though there was no oblong holes in said pivot fitting.

This configuration of special bolts and corresponding special washers correspond to one value of the throat area of the reverser nozzle. This invention then provides a greatly improved method for trimming the throat area value for a given thrust reverser. To change the throat area value of the reverser nozzle, i.e. to trim the nozzle throat area, one need only change the configuration of each bolt and washer pair as shown in FIGS. 5 and 6. In doing so, the reverser nozzle undergoes a rotation motion around the latching system 18 or 50 (FIGS. 1 and 2) forcing the doors 12 and 14, or the doors 40 and 42 with their half shells 44 and 46 to move away from, or closer to, each other. In this manner, the throat area is increased or decreased depending of the configuration of the bolt and washer pair used. Thus, to accommodate a two percent increase in the throat area value, the pivot axis is moved in the direction needed to move the pivots away from each other and cause the increase, by changing the bolts and associated washers to provide a greater offset of the bolt axis by an amount sufficient to increase the throat area value by two percent. The amount of the offset needed may be easily calculated, and a number of different bolts and washers may be provided to accommodate the necessary variations. Thus, the trimming adjustment is made without any need to redesign the thrust reverser. Once the ring adjustment is made, there is no need to further adjust the throat area value unless the engine performance degrades over time as is known to occur. When this does occur, the ring method may be repeated to restore the performance to its original values.

This method for adjusting the trimming of the rust reverser nozzle is accomplished without any actuators, thereby significantly reducing the cost over adjustment methods which require actuators.

Figure 4:
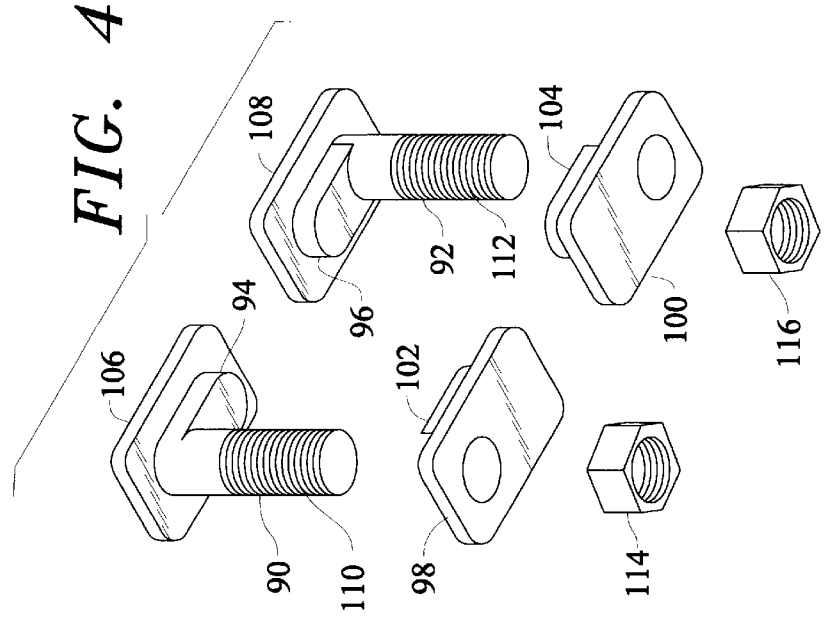
FIG. 4 is a perspective view of the bolt and washer holding the reverser exhaust nozzle for one specific trimming position.

As seen in FIG. 4, each of the pivot bolts 90, 92 has an elongated head 106, 108 which is greater in size that the elongated holes 82, 86. The bolts 90, 92 each has a cylindrical, threaded shank 110, 112 which passes through the washers 98, 100. The cylindrical shanks 110, 112 and the associated bosses 94, 96 are of a size as to snugly fit in the elongated holes 82, 86. Similarly, the bosses 102, 104 coact with the threaded shanks 110, 112 to snugly fit in the elongated holes 84, 88. The bolts 90, 92 are secured in position by the nuts 114, 116.

Figure 5A:
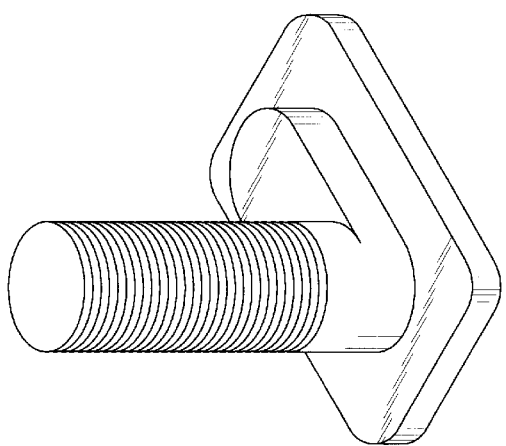
FIGS. 5a and 5b are perspective views respectively of a bolt and washer for holding the reverser exhaust nozzle for another specific trimming position.
Figure 5B:
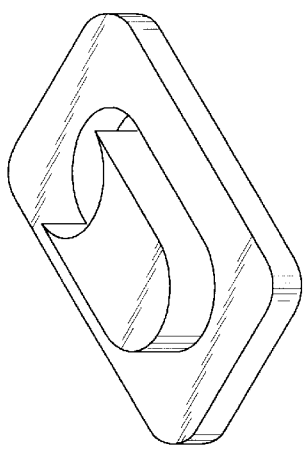
Figure 6A:
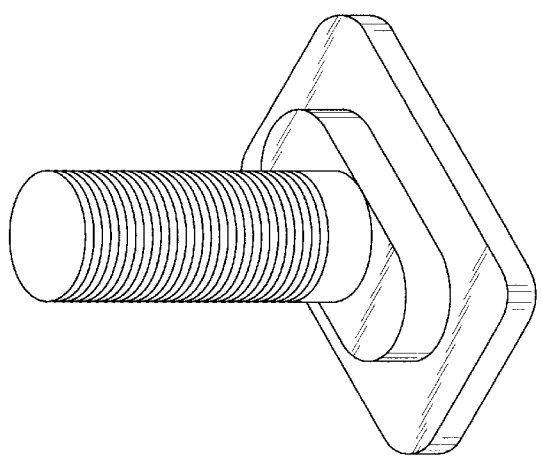
FIGS. 6a and 6b are perspective views respectively of a bolt and washer for holding the reverser exhaust nozzle for a third specific trimming position.
Figure 6B:
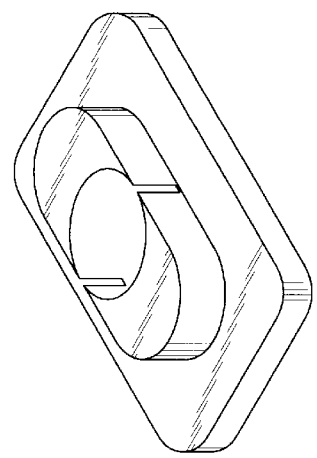

FIGS. 5a and 5b illustrate one pair of pivot bolt and washer wherein the threaded, cylindrical stem (and thus the pivot axis) will be positioned substantially in the middle of the major axis of the elongated, oval holes, and FIG. 6 illustrates another pair of pivot bolt and washer wherein the cylindrical stem (and thus the pivot axis) will be positioned at one end of the major axis of the elongated opening. By selecting the appropriate bolt and washer shape for the pivot bolts securing the thrust reverser doors, and removing the existing bolt and replacing the newly selected bolt, the trimming is readily accomplished.

While this invention has been described as having certain preferred features and embodiments, it will be apparent that it is capable of still further variation and modification without departing from the spirit of the invention, and this application is intended to cover any and all variations, modifications and adaptations of the invention as may fall within the spirit of the invention and the scope of the appended claims.

I claim:

1. A thrust reverser comprising a pair of symmetrical thrust reverser doors pivotally mounted on an axis which is substantially diametrically positioned with respect to the exhaust nozzle of an engine, hinge fittings secured to said doors, pivot bracket means secured to a fixed part of the engine, pivot bolts securing said hinge fittings of said thrust reverser doors to said pivot bracket means and forming the pivot axis for said doors, said pivot bracket means having elongated openings formed therein for receiving said pivot bolts, said pivot bolts having elongated shoulders for engaging one of said elongated openings and positioning said pivot bolts therein, and washer means having an elongated boss for engaging another of said elongated openings and thereby positioning said pivot bolts in said elongated openings, said pivot bolts retained in position by securement means.

2. A thrust reverser as in claim 1 and wherein said pivot bolts each comprise an elongated head, a cylindrical shank extending from said head, and said elongated shoulder being formed adjacent said head and adjacent said cylindrical shank.

3. A thrust reverser as in claim 2 and wherein said washer means comprises a head portion larger than the openings in said pivot bracket, and said boss has an elongated shape for snugly fitting into one of said openings, and a bolt-receiving hole formed in said boss for receiving the cylindrical shank of said pivot bolt at a location along the major axis of said elongated boss corresponding to the location of said cylindrical shank for positioning said shank with respect to the elongated opening.

4. A thrust reverser as in claim 1 and wherein said thrust reverser includes a pair of half-shells pivotally mounted to a fixed part of said engine and forming the exhaust outlet of said engine, a second pivot bracket secured to a fixed part of said engine for pivotally mounting said half-shells, pivot bolts securing said half-shells to said second pivot bracket and forming the pivot axis for said half-shells, a plurality of elongated openings formed in said second pivot bracket for receiving said pivot bolts, said pivot bolts having elongated shoulders for engaging one of said elongated openings and positioning said pivot bolts therein, and washer means having an elongated boss for engaging another of said elongated openings and thereby positioning said pivot bolts and the pivot axis of said half shells in said elongated openings.

5. A thrust reverser as in claim 4 and wherein said first and second pivot brackets are integrated into a single element.

* * * * *